US005306753A

United States Patent [19]

Montagna

[11] Patent Number: 5,306,753

[45] Date of Patent: Apr. 26, 1994

[54] COMPOUND CAPABLE OF ADHERING ON SMOOTH ALUMINIUM SURFACES AND BINDING WITH P.T.F.E. FILM

[75] Inventor: Michele Montagna, Pesaro, Italy

[73] Assignee: Alluflon - S.P.A., Italy

[21] Appl. No.: 969,423

[22] Filed: Oct. 30, 1992

[51] Int. Cl.[5] .............................................. C08L 77/00

[52] U.S. Cl. .................................... 524/247; 524/606; 524/608

[58] Field of Search ............... 524/591, 600, 247, 606, 524/608

[56] References Cited

U.S. PATENT DOCUMENTS 4,725,504 2/1988 Knudsen et al. ................. 428/473.5
5,015,517 5/1991 Walsh ................................. 428/156

*Primary Examiner*—Morton Foelak
*Attorney, Agent, or Firm*—Leonard Bloom

[57] ABSTRACT

A product which can, on one hand, adhere on smooth aluminum surfaces and on the other bind with polytetrafluoroethylene, consisting of a polyamide-imide resin mixed with dimethylaminoethanol and water in suitable percentages.

4 Claims, No Drawings

COMPOUND CAPABLE OF ADHERING ON SMOOTH ALUMINIUM SURFACES AND BINDING WITH P.T.F.E. FILM

This design patent application concerns a compound capable of adhering on smooth aluminium surfaces and binding with P.T.F.E. film (polytetrafluoroethylene), known commerially as "TEFLON".

The compound according to the invention was developed to resolve the problems related to the application of P.T.F.E. films on metal surfaces.

It should be remembered that P.T.F.E. is an organic compound which can resist a temperature of up to 250° C. continuously or a temperature of 400° C. for briefer periods. Thanks to this property and to its excellent anti-adhesion properties, P.T.F.E. is very widely used for realizing cooking pots and pans, tableware for the home and for all those items which require easy cleaning and must be resistant to high temperatures.

If on one hand the non-adhering qualities of this organic compound make the items on which it is used easy to clean, on the other hand, these very same qualities create the problem of how to make the P.T.F.E. adhere to the surfaces treated, in that P.T.F.E. is very difficult to bond chemically with other materials, in particular with metals, glass or ceramics, which are the materials principally used for manufacturing kitchenware.

Despite this, it has been proven that it is possible to adhere P.T.F.E. to an aluminium surface if the latter is previously roughened so as to provide a mechanical hold for the P.T.F.E. film.

One of the most common and widely used methods for roughening the aluminium surface consists of chemical pickling process which attacks the metal surface which is to be coated with NaOH (sodium hydroxide, commonly known as caustic soda) and HCL (hydrochloric acid).

In the production of aluminium pots and pans, metal disks, in various diameters and thickness, are immersed in a NaOH bath for degreasing and then in successive baths of HCL which attacks the metal surface thereby making it rough, and covering it with micro-cavities so as to provide the required mechanical hold.

P.T.F.E. is applied on the surface of the disks in an aqueous solution to ensure its penetration into the pores produced by the previous pickling treatment; the disks are then placed in kilns, where the P.T.F.E is sintered at a temperature of 370° C.; once the P.T.F.E. has solidified it is trapped in the micro-cavities on the metal surface.

The above system is commonly used for manufacturing aluminium pots and pans and consists of a pickling system in which the disks are first placed into successive treatment tanks and are then rinsed and dried and then conveyed to a series of "rolling machines" which apply the layer of P.T.F.E. with a lithographic type technique.

Each rolling machine consists of two rollers, a metal roller and a rubber roller, which rotate touching each other, and over which the aqueous solution of P.T.F.E. runs; the bottom of the rubber roller touches the pickled disks and uniformly applies the P.T.F.E. solution on the same.

In order to increase the thickness of the P.T.F.E. film, a set of rolling machines is used; the disks are coated repeatedly with the product and are dried before each successive coating; in general, there are four rolling machines, in which the same aqueous solution of P.T.F.E. with the addition of pigments, is used.

The above procedure consists of a thorough pickling of the aluminum with which large quantities of metals are removed remaining bound to the acids and to the bases of the tanks, so that their corrosive properties are very quickly exhausted.

The solutions in the tanks must therefore be replaced very frequently and the depleted solutions processed through purifying systems before drainage into the sewage system. Since the purification of the depleted solutions yields water and mud containing a quantity of aluminum salts directly proportional to the quantity of aluminum in the solutions, drainage of these muds in the sewage system increases the overall management costs of the purification system, which in itself is very high.

The purpose of this invention is to develop a product which can on one hand adhere to smooth aluminum surfaces and on the other bind with P.T.F.E. so as to make the above process less expensive, faster and less polluting, thanks to the possibility of eliminating the costly and lengthy deep pickling treatment currently required to roughen the metal surface so as to allow the film of TEFLON to adhere. The compound according to the invention consists of a polyamide-imide (formed by the reaction of 1, 2, 4 benzenetricarboxylic acid with 4, 4' diamino diphenyl methane ($C_9H_6O_6.C_{13}H_{14}N_2$) and known commercially as RHODEFTAL 200) mixed with dimethyl aminoethanol (commercially known as REXOLIN) and water in the following percentages:

| | | |
|---|---|---|
| A | RHODEFTAL 200 (Polyamide-imide) | 35.714% |
| B | REXOLIN (dimethylamine-ethanol) | 7.143% |
| C | WATER | 57.143% |

The mixture percentage of component (A) with respect to component (B) may vary by plus or minus 5%, as may do the mixture percentage of component (C) with respect to components (A+B).

By applying this compound on the previously degreased smooth aluminum surface, a first layer is formed on the disk over which the successive layers of TEFLON will easily and efficiently adhere.

I claim:

1. A compound which can adhere to smooth aluminum surfaces and bind with polytetrafluoreoethylene film, comprising a polyamide-imide resin mixed with dimethylaminoethanol and water.

2. The compound of claim 1, wherein the percentage of polyamide-imide resin ranges from approximately 30.714% to 40.714%, the percentage of dimethylaminoethanol ranges from approximately 2.143% to 12.143% and the percentage of water ranges from approximately 52.143% to 62.143%.

3. The compound of claim 2, wherein the percentage of polyamide-imide resin is 35.714%, the percentage of dimethylaminoethanol is 7.143%, and the percentage of water is 57.143%.

4. The compound of claim 1, wherein the polyamide-imide resin is 1, 2, 4 benzenetricarboxylic acid, polymer with 4, 4' diaminodiphenylmethane.

* * * * *